(12) United States Patent
Yushio et al.

(10) Patent No.: US 6,398,993 B1
(45) Date of Patent: Jun. 4, 2002

(54) METHOD AND APPARATUS FOR PRODUCING SYNTHETIC RESIN FILMS

(75) Inventors: Haruhisa Yushio; Takanori Nishida; Koji Hayashi; Hidetoshi Okashiro, all of Shiga; Tatsu Iinuma, Shizuoka, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/459,807

(22) Filed: Dec. 13, 1999

(30) Foreign Application Priority Data

Dec. 14, 1998 (JP) .......................................... 10-354655
Jan. 13, 1999 (JP) .......................................... 11-005983

(51) Int. Cl.[7] .................. B29C 47/92; B29C 55/14; B65H 20/00; D06C 3/02
(52) U.S. Cl. ....................... 264/40.7; 26/72; 26/89; 26/93; 226/110; 226/172; 264/138; 264/148; 264/160; 264/290.2; 425/135; 425/145; 425/305.1
(58) Field of Search ............ 264/40.1, 40.7, 264/138, 148, 160, 290.2; 425/135, 145, 305.1; 26/72, 89, 93; 226/110, 172

(56) References Cited

U.S. PATENT DOCUMENTS 4,173,611 A    11/1979   Benson et al.
4,210,987 A     7/1980   Benson et al.

FOREIGN PATENT DOCUMENTS

JP    57-57260     12/1982
JP    6-191700      7/1994

*Primary Examiner*—Leo B. Tentoni
(74) *Attorney, Agent, or Firm*—Schnader Harrison Segal & Lewis LLP

(57) ABSTRACT

A film production process having a film tentering step and a recovering step, characterized by detecting the side edge positions of the film running toward the recovering step, transferring the film running direction based on the detected information, and controlling the clamp start position of the film arriving at a tenter in the tentering step by clamp means, in the transverse direction of the film. A film production process having a film tentering step, characterized by controlling the clamp start position of a film arriving at a tenter by clamp means, in the range from 5 mm to 1,000 mm from the tip of the film in the longitudinal direction of the film.

6 Claims, 5 Drawing Sheets

METHOD AND APPARATUS FOR PRODUCING SYNTHETIC RESIN FILMS

BACKGROUND OF THE INVENTION

1. Field of the Invention

The present invention relates to a method and apparatus for producing a synthetic resin film. Particularly it relates to a method and apparatus for producing a synthetic resin film in which a tenter is used, which tenter stretches a continuously supplied film in the transverse direction or the transverse and longitudinal directions while the film travels under being clamped at both lateral edges thereof by moving clamp means, wherein improvement was achieved in clamping positions in the transverse direction and/or in the longitudinal direction of the film. The improvement brings reducing abnormal deformation or breaking of the film in the tenter and promoting efficiency in production of films.

2. Description of the Prior Art

Tenters in which a continuously supplied film is stretched in the transverse direction or the transverse and longitudinal directions while the film clamped at both lateral edges thereof by moving clamp means is moved therein have heretofore been used. Generally, the former tenter is called a transverse stretching machine and the latter tenter is called a simultaneous biaxial stretching. Such tenters are described, for example, in Japanese Patent Laid-Open (Kokai) No. HEI 6-191700 and Japanese Patent Publication (Kokoku) No. SHO 57-57260 (U.S. Pat. Nos. 4,173,611 and 4,210,987).

The former document discloses a means for adjusting positions of clamping means in the transverse direction based on signals obtained from detection of positions of both lateral edges of a film running toward a tenter.

The latter document discloses a tenter having a route (first route) for letting a continuously supplied film continuously run toward clamp means of a tenter and a route (second route) for letting a junk film continuously run toward a junk take-over device, and also having a means for selecting either of the routes,: i.e., a tenter having a junk film take-over device.

When a film is produced using a tenter having a junk film take-over device, the film running route is changed from the second route to the first route, and both longitudinal edges of the film arriving at the tenter are clamped by the clamp means and stretching in transverse direction is commenced. However, in this case, a phenomenon is observed, that the film is wrinkled and it is difficult to maintain the continuous transverse stretching. This phenomenon may be improved to some extent by adjusting the positions of the clamp means by detecting the positions of both lateral edges of the film running toward the tenter disclosed in the former document, but the improvement is not sufficient.

On the other hand, the conventional tenters are designed to ensure that the clamp means positively clamp the tip of the film when the tip of the supplied film is accepted by the clamp means. In these conventional tenters, the film is likely to be broken at the center portion in the transverse direction at the tip of the clamped film, and a phenomenon can be observed, that the breaking occurred at the tip propagates in the longitudinal direction of the film.

Each of the above phenomena becomes more and more conspicuous where the width of a film [is become] becomes broad or the speed of film fed to a tenter becomes high to promote efficiency of production of film.

SUMMARY OF THE INVENTION

The object of the present invention is to provide a method and apparatus for producing a film improved in the above problems of the conventional tenters.

The method for producing a synthetic resin film of the present invention to achieve the above object is as follows.

A method for producing a synthetic resin film: comprising a film supplying step for supplying an original film, a film tentering step for clamping both longitudinal edges of the film supplied from the film supplying step by a pair of continuously moving clamp means provided along both side edges of the film and for stretching the clamped film in the transverse direction of the film, a film recovering step for taking over the film supplied from the film supplying step, without feeding it to the film tentering step, and a film running direction changing step for cutting the film running toward the film recovering step and feeding the tip of the film to the film tentering step, and further comprising detecting the side edge position of the film fed toward the film recovering step and changing, the positions of the pair of clamp means in the transverse direction of the film based on a signal obtained through the detecting.

In the present invention, a tentering step or tenter means a step or apparatus having a function of stretching a supplied undrawn or drawn film at least in transverse (crosswise) direction of the film.

In the process for producing a synthetic resin film, it is preferable that the distance between a portion on the film fed to the film tentering step clamped at first by the clamp means and the tip of the film in the longitudinal direction of the film is not less than 5 mm and not more than 1,000 mm.

the part of the film between a portion on the film fed to the film tentering step clamped at first by the clamp means in the longitudinal direction is called the clamp-free portion, and the distance of the clamp-free portion is called the clamp-free length (CFL).

The idea of clamping the film remaining the clamp-free portion can also be applied to a film production process free from the film recovering step, and it reduces the breaking of the film likely to be caused at the tip of the clamped film, thus improving the film production efficiency is also obtained in the process.

DESCRIPTION OF THE PREFERRED EMBODIMENTS

Figure 1:
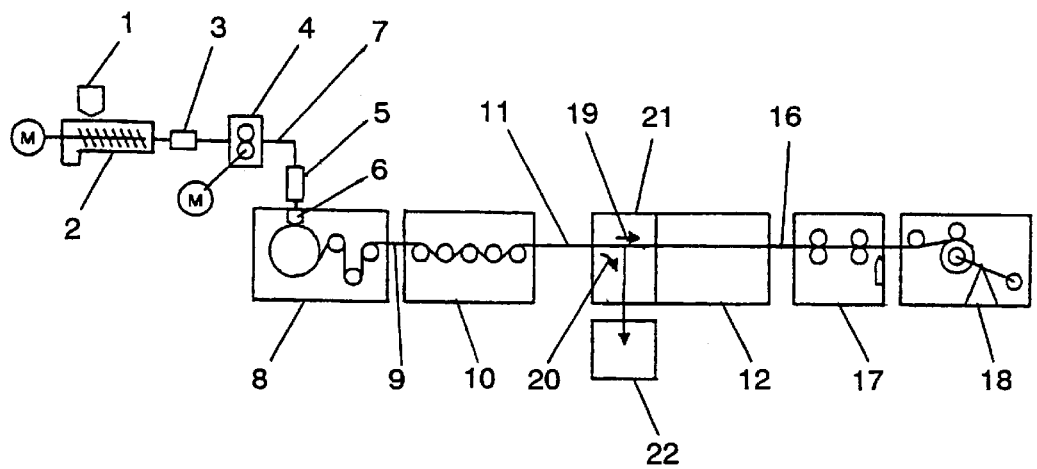
FIG. 1 is a general side view in respective of an embodiment of an apparatus for carrying out the film production process of the present invention.
Figure 2:
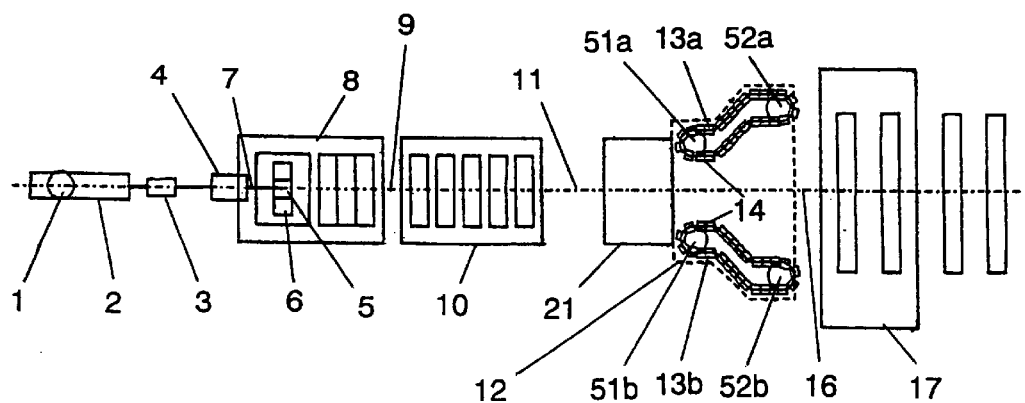
FIG. 2 is a partially omitted plan view of the apparatus shown in FIG. 1.

The film production apparatus of the present invention shown in FIGS. 1 and 2 is an apparatus for producing a biaxially oriented film. The apparatus includes a supplying component for supplying synthetic resin pellets, a raw film molding component for melting and extruding the resin for molding a raw film, a longitudinally stretching component for stretching the raw film (undrawn film) in the longitudinal direction (lengthwise direction) for forming a longitudinally stretched film (monoaxially oriented film), a tentering component for stretching the monoaxially oriented film in the transverse direction (crosswise direction) for forming a longitudinally and transversely stretched film (biaxially oriented film), and a take-up component for taking-up the biaxially oriented film.

The synthetic resin supplying component has a hopper 1 containing synthetic resin pellets.

The raw film molding component has an extruder 2 for melting and extruding the synthetic resin pellets supplied from the hopper 1, a first filter 3 for filtering the resin extruded from the extruder 2, a gear pump 4 for metering and feeding the resin fed through the first filter 3, a second filter 5 for filtering the resin supplied from the gear pump 4, a film molding die 6 for molding the resin supplied from the second filter 5 into a film, molten resin supply pipes 7 respectively provided between the extruder 2, the first filter 3, the gear pump 4, the second filter 5 and the film molding die 6, and a cooling and solidifying means 8 for cooling and solidifying the film extruded from the film molding die 6. Generally, a casting drum is used as the cooling and solidifying means 8.

The longitudinally stretching component has a longitudinal stretcher 10 for stretching the film (undrawn film) 9 formed by the cooling and solidifying means 8 in the longitudinal direction (lengthwise direction) of the film.

The tentering component has a tenter 12 for stretching the monoaxially oriented film 11 obtained by longitudinally stretching by the longitudinal stretcher 10, in the transverse direction of the film (laterally).

The tenter 12 has endlessly rotating chains 13a and 13b provided along both lateral edges of the film, film clamp means 14 provided on the chains 13a and 13b with a space therebetween, and clamp engaging or disengaging means for making the clamp means 14 engaged with or disengaged from the film.

The endlessly rotating chains 13a and 13b are disposed to form an inlet parallel portion in which both the chains are substantially kept parallel to each other at the inlet of the tenter 12, an expanding portion downstream of it in which both the chains gradually become more apart from each other, and an outlet parallel portion downstream of it in which both the chains are substantially kept parallel to each other.

The taking-up component has a take-over device 17 for taking over the biaxially oriented film obtained by transversely stretching by the tenter 12 and a winder 18 for winding the film taken over by the take-over device 17.

In the passage in which the monoaxially oriented film 11 runs from the longitudinally stretching component to the tentering component, a recovering component for taking over a junk film is provided. Thus, the passage is divided into two passages; a normal film passage indicated by arrow 19 in which the monoaxially oriented film 11 runs toward the tentering component and a junk film passage indicated by arrow 20 in which the junk film runs toward the recovering component. At the branch between the two film passages 19 and 20, a film running direction is changed.

The film running direction changing component has a film running direction changing means 21, and the recovering component has a film recovering means 22.

The film production apparatus of the present invention shown in FIG. 1 will be described below in more detail in reference to FIGS. 3 through 7.

The film supplying step has a film supply means, 31. The film supply means 31 is usually film supply rolls for feeding the film fed from the previous step, for example, the monoaxially oriented film 11 fed from the longitudinally stretching step to the subsequent step, but can also be film supply rolls for supplying the film unwound from a package of an extrusion-molded film (undrawn film) or a:monoaxially oriented film.

The following description shows a case where: the monoaxially stretched film 11 fed from the longitudinally stretching step is fed to the subsequent step.

The film running direction changing means 21 has a film cutter 32 and a film running direction selector 33.

The film cutter 32 is a rotary cutter having a fixed blade 34 and a rotating blade 35 positioned to face the fixed blade 34, with the film passage kept between both the blades. The film running direction selector 33 is a plate flap 36 supported pivotally at one end and capable of moving vertically at the other end to allow or prevent the running of the film 11 toward the tenter 12.

A tension roll 37 for adjusting the tension acting on the film 11, a guide roll 38 provided downstream of the tension roll 37 for guiding the film, and nip rolls 39 provided downstream of the guide roll 38 for nipping the film are respectively installed upstream of the film cutter 32. Nip rolls 40 are provided downstream of the film cutter 32 and upstream of the flap 36.

In the downstream of the nip rolls 40 in the direction of the junk film running passage 20, delivery belt conveyors 41 for holding the junk film 11b between them and taking over thereof, nip rolls 42 provided downstream of the delivery belt conveyors 41 for nipping the junk film 11b, and a shredder 43 provided downstream of the nip rolls 42 for shredding the junk film 11b are respectively installed. The shredder 43 has a fixed blade 44 and a rotating blade 45 provided to face the fixed blade 44.

Figure 3:
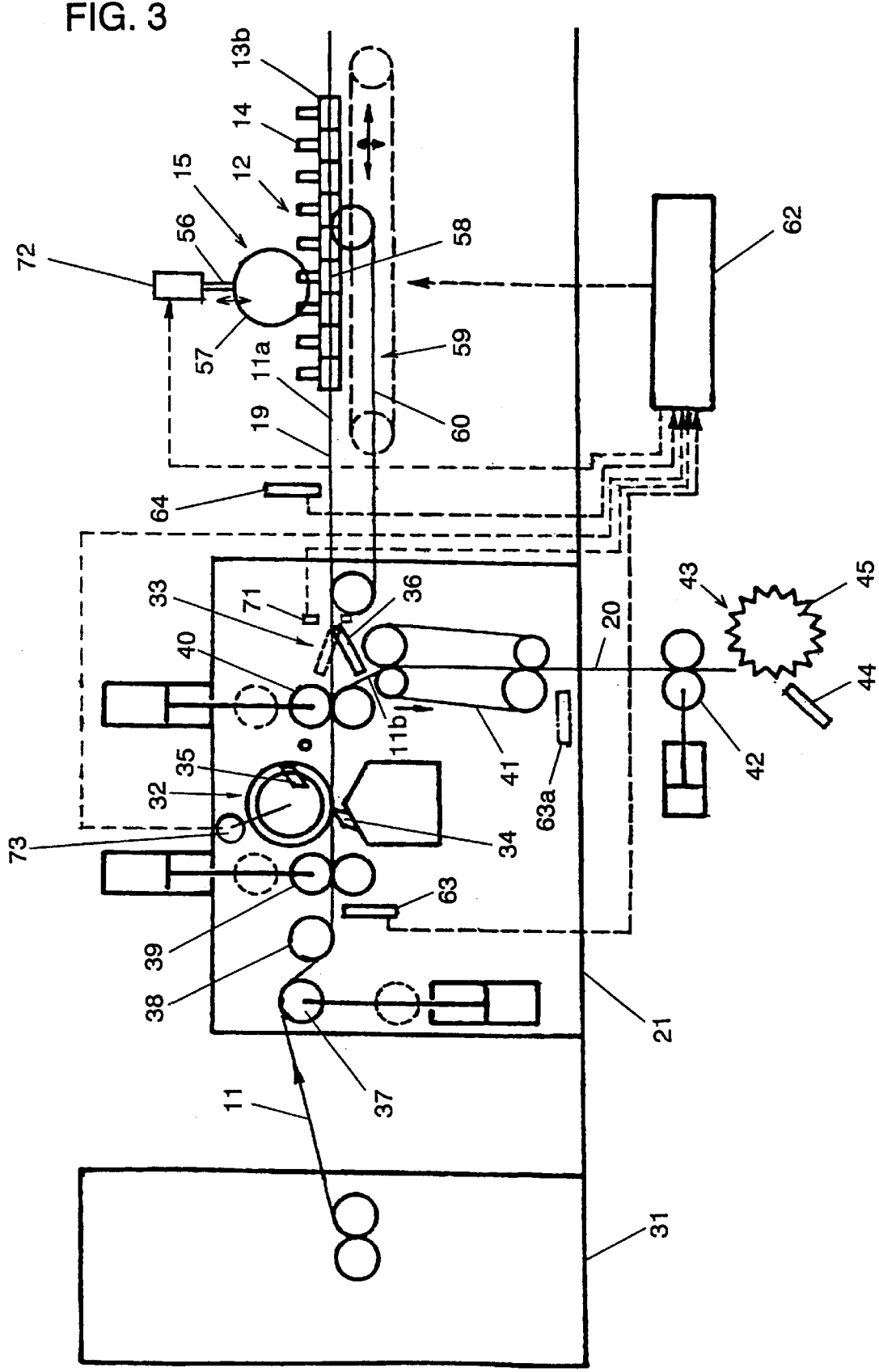
FIG. 3 is a side view of the apparatus shown in FIG. 1, in which a film melt-extrusion molding apparatus and a longitudinal stretching apparatus are replaced by a film supplying device while a film take-up apparatus is omitted, to show the other portions in more detail.

In FIG. 3, when the flap 36 is positioned as indicated with a solid line, the film 11 runs as the normal film 11a along the normal film passage 19 to reach the tenter 12. On the other hand, when the flap 36 is positioned as indicated with a dotted line, the film runs as the junk film 11b along the junk film passage 20 to reach the shredder 43.

A case where the film 11 supplied from the film supply means 31 is treated as the junk film 11b will be described. The film 11 supplied from the film supply means 31 passes through the tension roll 37, the guide roll 38, between the nip rolls 39 and between the nip rolls. 40 and further, as the junk film 11b, between the delivery belt conveyors 41 and between the nip rolls 42 and finally reaches the shredder 43 in which the junk film 11b is shredded by the fixed blade 44 and the rotating blade 45. In this case, the flap 36 is positioned as indicated by a dotted line. The shredded film is recovered and used as a raw material for producing a film or for any other application.

A case where the film 11 running on the junk film passage 20 is transferred to run in the normal film passage will be described. The film 11 running along the junk film passage 20 is cut in the transverse direction by the fixed blade 34 and the rotating blade 35 of the film cutter 32 actuated. At this time, the flap 36 is also actuated to transpose from the position indicated by a dotted line to the position indicated by a solid line. The film cutter 32 and the flap 36 are actuated by any proper electric signal system not illustrated.

At this time, the cut-off end of the film 11 is taken over along the junk film passage 20 to the shredder 43. The remaining cut tip of the film 11 is guided by the flap 36 and fed along the normal film passage 19 toward the tenter 12.

Figure 4:
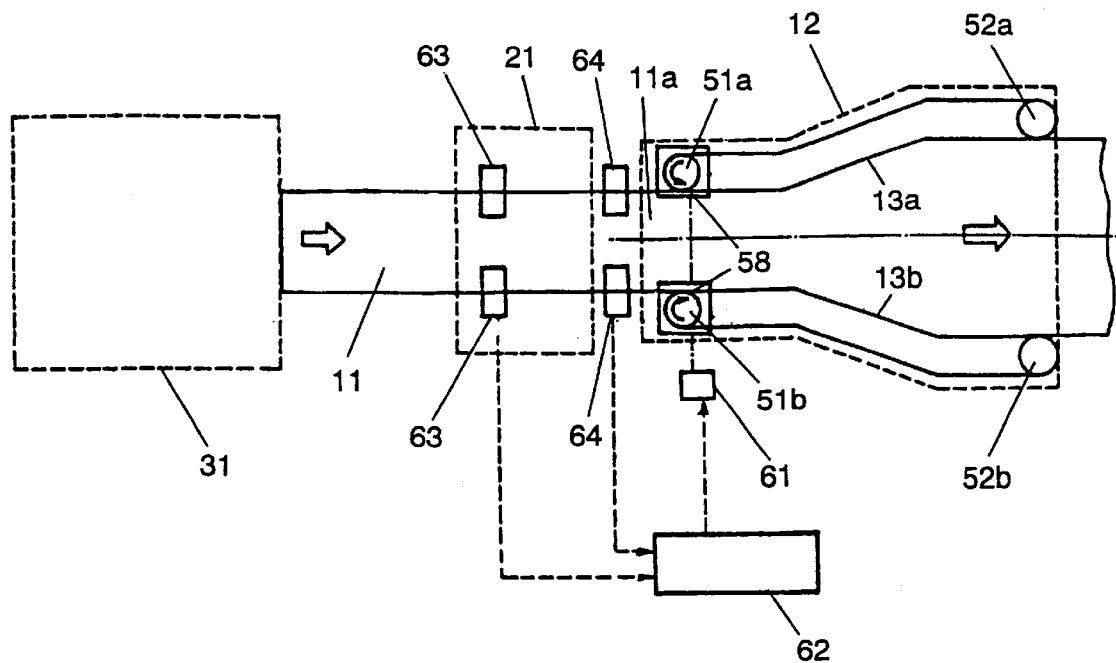
FIG. 4 is a partially omitted plan view of the apparatus shown in FIG. 3

In FIGS. 3–4, the tenter 12 has the endless chains 13a and 13b rotating along both side edges of the film to be transversely stretched and the clamp engaging and disengaging means 15. Furthermore, the tenter 12 has electrically driven and rotated sprockets 51a and 51b for rotating the chains 13a and 13b and sprockets 52a and 52b for returning the chains 13a and 13b to the sprockets 51a and 51b. Film clamp means 14 spaced from each other are attached on the chains 13a and 13b respectively.

Figure 5:
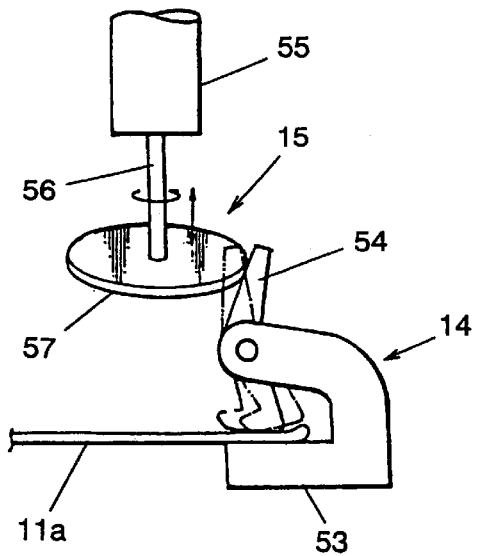
FIG. 5 is a side view of an embodiment of the clamp means used in the tenter in the apparatus shown in FIG. 3.

An example of the clamp engaging and disengaging means 15 is shown in FIG. 5. The clamp means 14 shown in FIG. 5 comprises a clip 53 attached on the chain 13a (not illustrated) and a vane 54 pivotally attached to the clip 53.

The clamp engaging and disengaging means 15 shown in FIG. 5 is provided with a motor 55, a rotating shaft 56 attached to the motor 55, a rotating disc 57 attached to the tip of the rotating shaft 56, and an elevator (not illustrated) for elevating and lowering the motor 55. The elevator adjusts the state of clamping of the film with the vane 54 by changing the position of the rotating disc 57 vertically. The elevator is installed in the frame of the tenter 12.

If the vane 54 moved with the movement of the chain 13a contacts the periphery of the rotating disc 57, the top of the vane 54 is pressed outwardly which is indicated with a solid line, and the film 11a is clamped between the bottom face of the vane 54 and the top face of the clip 53. The clamped film 11a is released from the clamp means 14 by a clamp release means (not illustrated) provided near the outlet of the tenter 12.

The tenter 12 is provided with a film conveyor 59 for guiding the film 11a fed from the flap 36 to the position where it is clamped by the clamp means 14, i.e., to a clamp start position 58.

The film conveyor 59 is composed of an endless rotating belt 60. The film 11a contacts the upper surface of the belt 60, and is carried with the movement of the belt 60 toward the tenter 12. It is preferable that the film conveyor 59 comprises a belt 60 having perforations and an air sucker provided on the back side of the belt 60.

It is preferable that the film conveyor 59 is positioned as indicated by a solid line when the film 11a is accepted by the tenter 12, and can be retracted to the position indicated by a dotted line when it is not necessary.

The tenter 12 is provided with a drive 61 for moving and adjusting the clamp start position 58 in the transverse direction of the film 11a. The drive 61 is disclosed in Japanese Patent Laid-Open (Kokai) No. HEI 6-191700 mentioned above. The tenter 12 is provided with a controller 62 for issuing signals to control the drive 61 for changing the clamp start position 58.

The film running direction changing means 21 is provided with first position detecting means 63 for detecting a side edge position of the film 11 when the film 11 runs toward the junk film passage 20. The position detecting means 63 comprises a sensor capable of detecting the side edge position of the film 11 without any contact, for example, an optical sensor. The installation position of the position detecting means 63 can also be the position 63a indicated by a dotted line immediately downstream of the delivery belt conveyors 41 in FIG. 3. It is possible to provide the position detecting means 63 at one side edge of the film 11 or both side edges of the film 11 as shown in FIG. 4, however providing at both side edges is preferable.

The signals relating to the detected side edge positions of the film 11 delivered from the first position detecting means 63 are sent to the controller 62. The controller 62 sends a signal for controlling the clamp start position 58 to the drive 61, and the drive 61 changes the clamp start position 58 for the film 11a in the, transverse direction of the film. This change ensures that both edges of the film 11a running toward the tenter 12 as the normal film cut by the actuated film cutter 32 are adequately clamped by the clamp means 14.

It is preferable that the change of the clamp start position 58 is positively effected when the side edge positions of the film 11 are different from the normal positions by more than 20 mm. It is more preferable that the change is positively effected when different by more than 5 mm.

In the embodiment described above, it is preferable that a second position detecting means 64 for detecting at least one side edge position of the film 11a is provided in the normal film passage 19 between the flap 36 and the inlet of the tenter 12.

The signals of the side edge positions of the film 11a detected by the second position detecting means 64 are also sent to the controller 62 and used as signals for controlling the clamp start position 58 of the film 11a. The signals form the second position detecting means 64 are used to ensure that the clamp start position 58 which has been adjusted by the signals from the first position detecting means 63 is further adjusted by the signals from the second position detecting means 64.

In the above embodiment, though production of a film oriented in biaxial which is obtained by stretching an extruded-molded film (undrawn film) in the longitudinal direction and by stretching thus obtained the mono-axially oriented film in the transverse direction by a tenter is explained, it is acceptable that a film supplied to a tenter is an undrawn film and the undrawn film is stretched in both the transverse and longitudinal directions during passage through the tenter.

Figure 6:
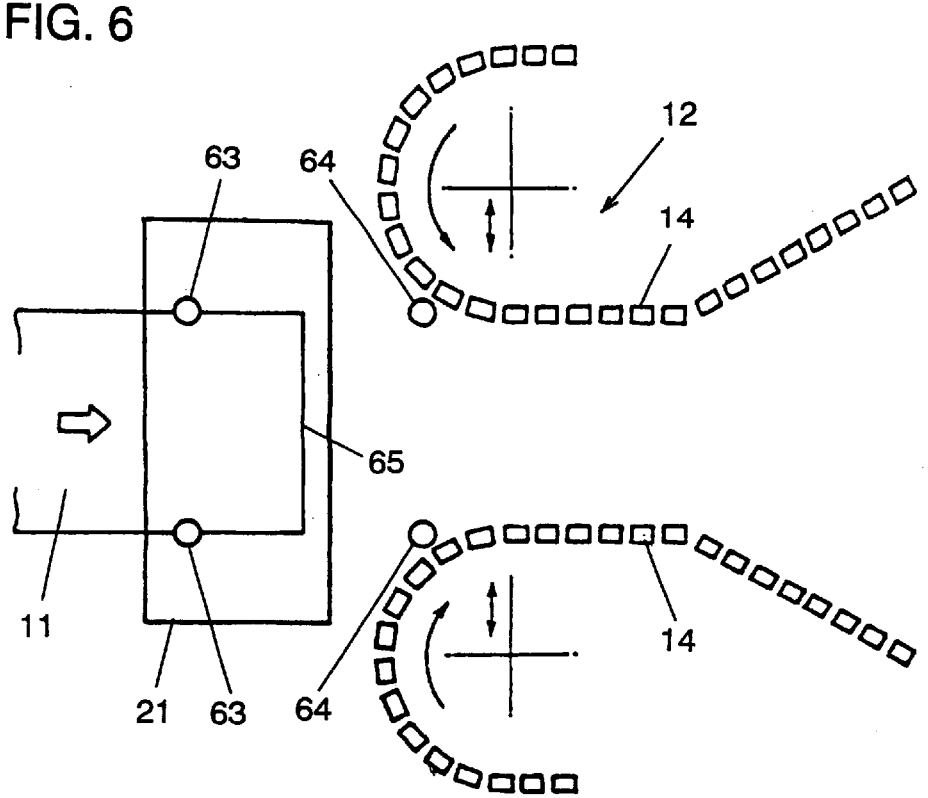
FIG. 6 is a plan view of a film running toward the tenter in the apparatus shown in FIG. 3.
Figure 7:
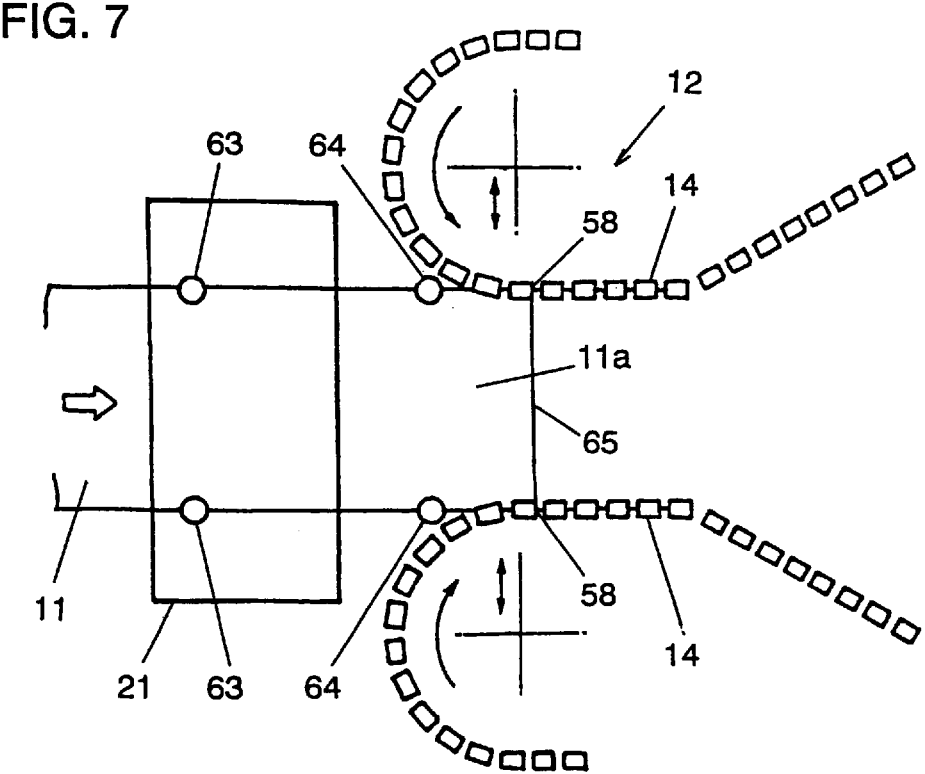
FIG. 7 is a plan view of a film clamped at the clamp start position in the tenter in the apparatus shown in FIG. 3.

FIG. 6 shows a state where the tip 65 of the film 11a runs toward the inlet of the tenter 12. FIG. 7 shows a state where the tip 65 of the film 11a is clamped by the clamp means 14 at the clamp start position 58.

It is preferable that after the tip of the normal film 11a has been clamped by the clamp means 14 at the clamp start position 58, the clamp start position 58 is kept controlled by the signals from the second position detecting means 64.

The film 11b running toward the junk film passage 20 may be affected by the action of the film recovering means 22 and may not be stable in running position or style. If the film is transferred to run in the normal film passage 19 direction in this state, the running position of the normal film 11a is affected by the abnormal running of the junk film 11b.

The film producing apparatus of the present invention described above is provided with the first position detecting means 63. So, the normal film 11a reaching the tenter 12 is clamped by the clamp means 14 adjusted in position for accepting it, and the normal film 11a is normally transversely stretched by the tenter 12, substantially without being affected by the abnormal running of the junk film 11*b*.

The adjustment of the clamp start position 58 by the first position detecting means 63 described above is to adjust the position in the transverse direction of the film. These position adjusting means are called first clamp start position adjusting means.

In the film producing apparatus of the present invention, it is preferable that a means for adjusting the clamp start position in the machine direction (longitudinal direction) of the film is further provided at the tip portion of the film. FIG. 3 shows the clamp start position adjusting means added at the tip of the film. The position adjusting means is called a second clamp start position adjusting means.

The second clamp start position adjusting means will be described. This comprises a film tip detecting means 71 provided between the flap 36 and the inlet of the tenter 12 for detecting that the film tip has passed, a clamp engaging and disengaging means elevating means 72 for elevating and lowering the clamp engaging and disengaging means 15 for making the clamp means 14 engaged with and disengaged from the film, and the controller 62 for receiving the signal indicating the passing of the film tip from the film tip detecting means 71 and sending a signal for controlling the elevation or lowering to the clamp engaging and disengaging means elevating means 72 based on the received signal.

This control is based on the time when the film tip detecting means 71 has detected the passing of the tip of the film 11, the running speed of the film 11 at that time, and the distance obtained by adding a specific distance to the distance between the film tip detecting means 71 and the clamp start position 58.

A value in the range from 5 mm to 1,000 mm is used as the specific distance (length). This is the clamp-free length (CFL). This control is intended to ensure that the position at which the clamp means clamp the film at first becomes 5 mm to 1,000 mm upstream of the film tip. In other words, this clamp method forms a clamp-free portion with a length of 5 mm to 1,000 mm at the tip portion of the film.

The film tip detecting means 71 is a sensor capable of detecting the passing of the film tip, preferably a non-contact type sensor, for example, an optical sensor.

Instead of the film tip detecting means 71, a means 73 for detecting the film cutting time, for example, a rotary encoder can also be provided in the film cutter 32, to send the signal obtained from it to the controller 62.

Figure 8:
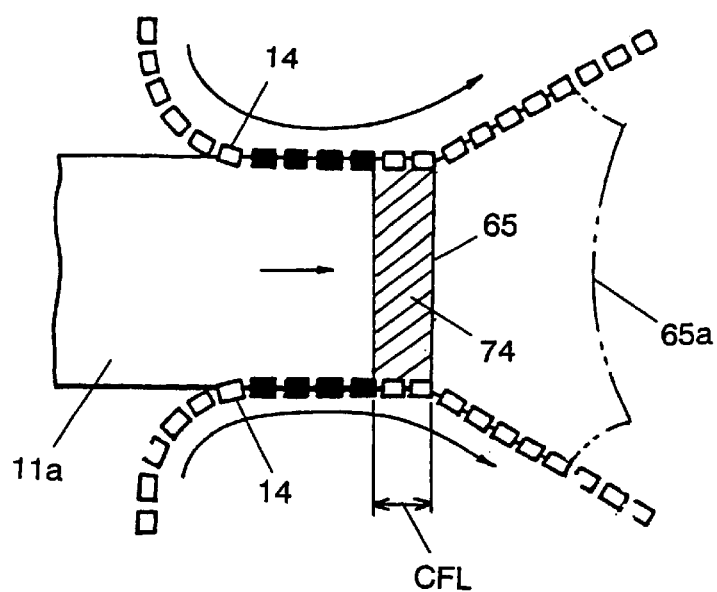
FIG. 8 is a plan view of a film stretched by the tenter in the apparatus shown in FIG. 3.

A state where a film having a 5 mm to 1,000 long clamp-free portion formed at the tip portion of the film is clamped is shown in FIG. 8. In the drawing, the clamp means 14 indicated in black are those which clamp the side edges of the film 11*a*, and the clamp means 14 indicated in white are those which do not clamp the side edges of the film 11*a*.

The portion with the length of CFL upstream of the tip 65 of the film 11*a*, i.e., the hatched portion is a clamp-free portion 74. In the drawing, a state where the film 11*a* clamped at a position immediately upstream of the clamp-free portion 74 moves with the movement of the clamp means 14 and begins to be transversely stretched is shown by a dot-dash line. The tip 65*a* is deformed compared to the tip 65 formed at the moment when clamping starts, but the film tip is not broken.

Figure 9:
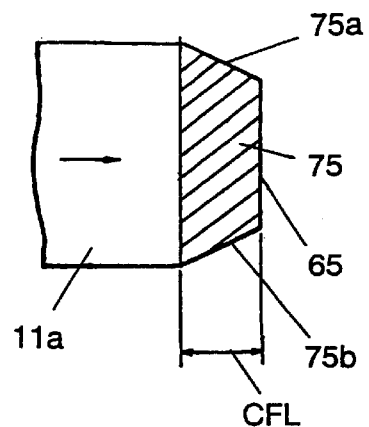
FIG. 9 is a plan view of another example of a film tip form used in the present invention.

The tip of the film 11*a* shown in FIG. 8 is straight in the transverse direction, but as shown in FIG. 9, the tip of the film 11*a* can be formed to project trapezoidally in the downstream direction (forward direction). To form the trapezoidally projected tip 75, the film cut straight in the transverse direction by the film cutter 32 can be further cut by traversing traverse cutters (not illustrated) in the transverse direction of the film on both sides without cutting the central portion. The trapezoidally projected tip portion 75 consisting of the straight tip 65 and tapered portions 75*a* and 75*b* can be used as the clamp-free portion 74. Therefore, it is preferable that the heights of the tapered portions 75*a* and 75*b* in the machine direction (longitudinal direction) of the film are 5 mm to 1,000 mm. In this case, when the film tip 65 has progressed by a distance of 5 mm to 1,000 mm from the clamp start position, the film 11*a* is automatically clamped.

Figure 10:
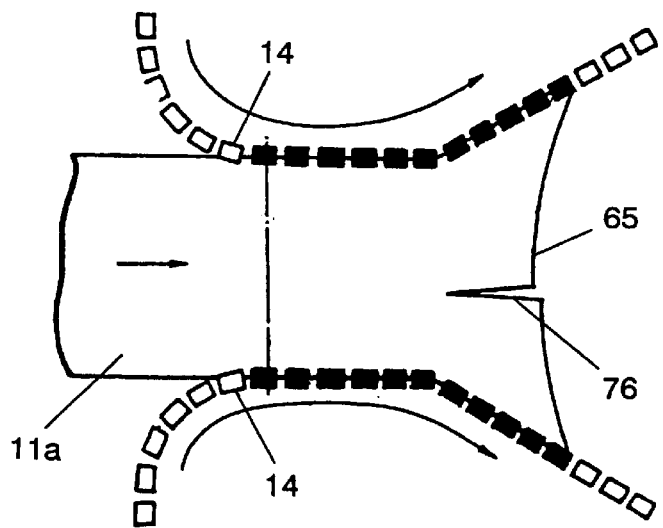
FIG. 10 is a plan view of a film broken state caused when the film is stretched by a tenter.

If the film without the clamp-free portion 74 is clamped, a crack 76 caused by stress concentration at the tip is likely to occur at the tip 65, and it propagates upstream, to break the film. A film in this state is shown in FIG. 10.

When a polyethylene terephthalate film was treated by the tenter 12 while the length CFL of the cramp-free portion was variously changed, the film tip was highly likely to be cracked in a length range of 0 mm to 2.5 mm, and the film tip hung down and was caught in the tenter 12 not allowing smooth lateral stretching in a length range of 1,200 mm to 1,400 mm. It was found that in a length range of 5 mm to 1,000 mm, smooth transverse stretching could be effected.

The above has described a case where the film producing apparatus of the present invention having the recovering step has the first clamp start position adjusting means, and a case where said apparatus has both the first clamp start position adjusting means and the second clamp start position adjusting means. However, even the film producing apparatus without the recovering step can prevent the film from being wrinkled and broken in the tenter, to decrease the wrinkling and breaking, if it has the second clamp start position adjusting means for controlling the first clamping position under forming the clamp-free portion at the tip portion of the film.

What is claimed is:

1. A method for producing a synthetic resin film comprising a film supplying step for supplying an original film, a film tentering step for clamping both longitudinal edges of the film supplied from the film supplying step by a pair of continuously moving clamp means provided along both side edges of the film and for stretching the clamped film in the transverse direction of the film, a film recovering step for taking over the film supplied from the film supplying step, without feeding it to the film tentering step, and a film running direction changing step for cutting the film running toward the film recovering step and feeding the tip of the film to the film tentering step, and further comprising detecting the side edge position of the film fed toward the film recovering step and changing the positions of the pair of clamp means in the transverse direction of the film based on a signal obtained through the detecting.

2. A method for producing a synthetic resin film according to claim 1, wherein the distance between a portion on the film fed to the film tentering step clamped at first by the clamp means and the tip of the film in the longitudinal direction of the film is not less than 5 mm and not more than 1,000 mm.

3. A method for producing a synthetic resin film comprising a film supplying step for supplying an original film and a film tentering step for clamping both longitudinal edges of the film supplied from the film supplying step by a pair of continuously moving clamp means provided along both side edges of the film and for stretching the clamped film in the transverse direction, wherein the distance between a portion on the film fed to the film tentering step clamped at first by the clamp means and the tip of the film in the longitudinal direction of the film has a length not less than 5 mm and not more than 1,000 mm.

4. An apparatus for producing a synthetic resin film comprising a film supplying device for supplying an original film, a film tentering device for clamping both longitudinal edges of the film supplied from the film supplying device by a pair of continuously moving clamp means provided along both side edges of the film and for stretching the clamped film in the transverse direction, a film recovering device for taking over the film supplied from the film supplying device, without feeding it to the film tentering device, and a film running direction changing device for cutting the film running toward the film recovering device and feeding the tip of the film to the film tentering device and further comprising a recovered film side edge position detecting device for detecting the side edge position of the film fed toward the film recovering device and a clamp means position changing device for changing the positions of the pair of clamp means in the transverse direction of the film are provided, so that the positions of the pair of clamp means are changed in the transverse direction of the film by the clamp means position changing device based on a side edge position signal of the film detected by the recovering film side edge position detecting device.

5. An apparatus for producing a synthetic resin film according to claim 4, wherein a clamp position adjusting means for adjusting the first clamp positions of the film by the clamp means is provided to ensure that the distance between a portion on the film fed to the film tentering device clamped at first by the clamp means and the tip of the film in the longitudinal direction of the film becomes not less than 5 mm and not more than 1,000 mm.

6. An apparatus for producing a synthetic resin film comprising a film supplying device for supplying an original film and a film tentering device for clamping both longitudinal edges of the film supplied from the film supplying device by a pair of continuously moving clamp means provided along both side edges of the film and for stretching the clamped film in the transverse direction, wherein a clamp position adjusting means for adjusting the first clamp positions of the film by the clamp means is provided to ensure that the distance between a portion on the film fed to the film tentering device clamped at first by the clamp means and the tip of the film in the longitudinal direction of the film is not less than 5 mm and not more than 1,000 mm.

\* \* \* \* \*

UNITED STATES PATENT AND TRADEMARK OFFICE
CERTIFICATE OF CORRECTION

PATENT NO. : 6,398,993 B1
DATED : June 4, 2002
INVENTOR(S) : Yushio et al.

It is certified that error appears in the above-identified patent and that said Letters Patent is hereby corrected as shown below:

Column 1,
Line 60, please delete "[is becomes]".

Column 2,
Line 29, please insert -- Here, -- before "the part"

Signed and Sealed this

Nineteenth Day of November, 2002

*Attest:*

*Attesting Officer*

JAMES E. ROGAN
*Director of the United States Patent and Trademark Office*